(12) United States Patent
Couse

(10) Patent No.: US 8,396,460 B2
(45) Date of Patent: Mar. 12, 2013

(54) SYSTEM AND METHOD FOR PROVIDING CALLED PARTY AWARENESS INFORMATION

(75) Inventor: Peter Francis Couse, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 348 days.

(21) Appl. No.: 12/661,940

(22) Filed: Mar. 25, 2010

(65) Prior Publication Data

US 2011/0237233 A1 Sep. 29, 2011

(51) Int. Cl.
*H04M 3/42* (2006.01)
(52) U.S. Cl. .................. 455/415; 455/414.1; 455/550.1; 455/567; 379/142.11
(58) Field of Classification Search .................. 455/415, 455/414.1, 550.1, 567; 379/142.11
See application file for complete search history.

(56) References Cited

U.S. PATENT DOCUMENTS

| 7,330,720 | B2 * | 2/2008 | Hinz | 455/422.1 |
| 2006/0148458 | A1 | 7/2006 | Komaria et al. | |
| 2006/0227963 | A1 * | 10/2006 | Bernard et al. | 379/388.01 |
| 2006/0286970 | A1 * | 12/2006 | Otobe et al. | 455/415 |

FOREIGN PATENT DOCUMENTS

WO WO 03/056784 A1 5/2009

* cited by examiner

*Primary Examiner* — Nghi H Ly

(57) ABSTRACT

A system and phone for providing called party awareness information to a calling party. As disclosed, a communication service provider can receive identification information associated with a called device from the keypad of the phone. The communication service provider can determine whether the called device is associated with the communication service provider or not. The communication service provider can use the identification information to determine the local time when the called device is not associated with the phone system. Alternatively, the communication service provider can use offsets to determine the local time generated by the called device when the called device is associated with the communication service provider. The offsets can be provided by fixed phone locations or non-fixed phone locations. Thereafter, the communication service provider can return the local time to the phone where it can be displayed.

16 Claims, 7 Drawing Sheets

SYSTEM AND METHOD FOR PROVIDING CALLED PARTY AWARENESS INFORMATION

TECHNICAL FIELD

This application generally relates to communications, and more particularly, to a communication system for determining awareness information about a called party and providing that information to a calling party.

BACKGROUND

In the late 80's, caller identification (Caller ID) became a popular service provided to customers by numerous telecommunication companies. The standard Caller ID services provided a customer with an indicator of who was calling without requiring the customer to answer the call. In typical operations, the Caller ID services would retrieve information about the calling party from a database and then provide that information to the called party. The information was often provided in the form of a caller's telephone number and a name associated with that number.

On the flip side, however, calling parties had little information about the party they were placing a call to. In the early days of telephony, a caller typically knew the location of who they were calling based on the phone number used to reach them. For instance, when calling a home or office number the caller usually knew the location where these calls would be answered based on the dialed area code.

Today, with the proliferation of cellular and enterprise phone system features such as call forwarding and twinning, it has become nearly impossible to know the physical location of a called party for any given call. The called party's local time would also be very difficult to discover. A called party using a cellphone or enterprise phone system can be anywhere in the world without the caller knowing. This lack of awareness of where a called party is physically located means that they could be in a different time zone. Therefore the caller could be calling at a time that is inappropriate like after business hours or in the middle of the night. Furthermore, if the caller was made aware of the called party's location, the caller may chose not to place the call or select alternative methods in order to avoid the called party having to incur roaming or long distance charges.

To overcome these challenges, callers have used the called party's address via their business card to determine the called party's time zone. Callers would also learn to recognize certain area codes within numbers dialed in terms of the time zone they are in. This however, did not allow them to determine the location of a called party who is mobile. A need therefore exists for a system and method that provides called party awareness for overcoming the above-described limitations.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

Figure 1:
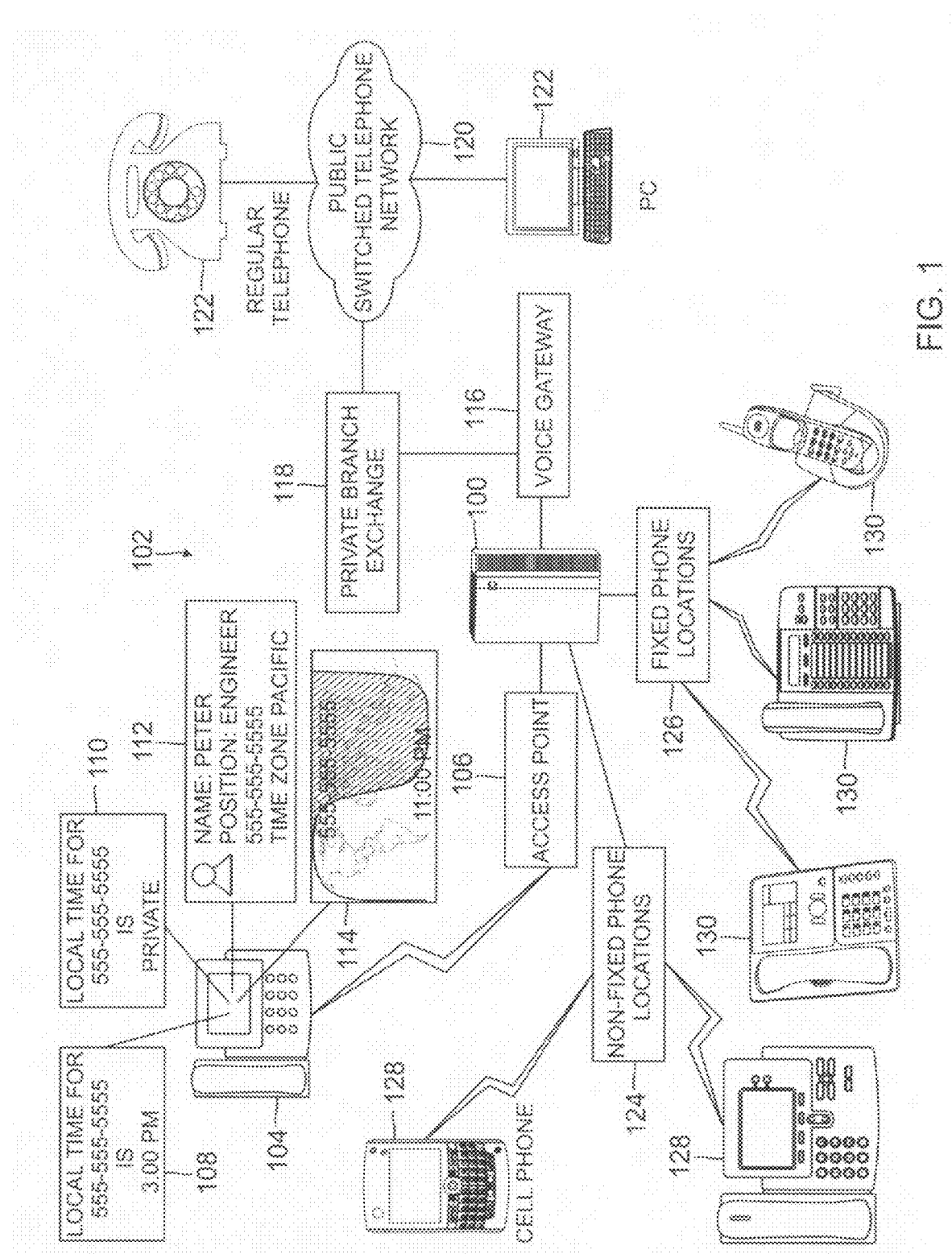
FIG. 1 depicts a typical operating environment for the called party awareness system and method in accordance with one aspect of the present application.

The description set forth below in connection with the appended drawings is intended as a description of presently-preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Overview

Generally described, the present application relates to a communication system, and more particularly, to a system and method for facilitating improved communication among calling and called parties. In one illustrative embodiment, a communication device having a display and keypad is provided. The device, such as a calling phone, through several processes, can retrieve the local time of a called device and display the local time of the called device on the display of the phone. These processes can include receiving identification information associated with the called device from the keypad of the phone. Typically, the identification information can be a phone number. The identification information can then be provided to a Voice over Internet Protocol (VoIP) phone system. The VoIP phone system can determine whether the called device is associated with the VoIP phone system or not. The VoIP phone system can use the identification information to determine the local time when the called device is not associated with the VoIP phone system. Alternatively, the VoIP phone system can use an offset provided by the called device to determine the local time when the called device is associated with the VoIP phone system. Thereafter, the VoIP phone system can return the local time to the phone where it can be displayed.

In essence, the system and method presented herein discloses a communication system that provides for called party awareness information to be distributed to a calling party. In one embodiment of the present application, the calling device can display a called party's local time and/or a time zone where the party is located. In one embodiment, the local time of a mobile device can be provided, the mobile device including a cellphone, smart phone, PC softphone, etc. The system and method presented herein can also have the ability to show a local time for numerous fixed location phones that are associated with the phone system e.g. office phone, phone in another geographic office location that the called party is logged into, teleworker phone at home, etc. In one embodiment, a local time for fixed location phones that are external to the phone system can be shown.

The above embodiments represent a small set of applications in which the system can be used. One skilled in the relevant art will appreciate that the present application can be extended to multiple embodiments beyond those described above. More details regarding additional embodiments will be described in further details below.

Networked Environment

The caller's device described above can display the local time of a called party either just prior to or at the time of placing the call. The information provided can include, for example, the called party's local time, their business card information, a map of their location, and their presence status. The environment, depicted in FIG. 1, represents a typical operating environment 102 for the called party awareness phone system 100, which may also be referred to as the VoIP phone system, phone system, or system. Those skilled in the relevant art will appreciate that fewer or more components can be used within the system 100 and those components described therein are for purposes of illustration.

The illustrative environment 102 of FIG. 1 can include a phone system 100 and numerous components distributed over a networked environment. The networked environment can use logical connections to one or more remote computers or similar devices. These logical connections can be achieved by a communication device coupled to or integral with the phone system 100. The phone system 100 can be or include, for example, a server, a router, a network personal computer, a client, a peer device, or other common network node, and typically includes many or all of the elements associated with a standard server.

The phone system 100 can be logically connected to networks that can include a local area network (LAN), wide area network (WAN), personal area network (PAN), campus area network (CAN), metropolitan area network (MAN), or global area network (GAN). Such networking environments are commonplace in office networks, enterprise-wide computer networks, intranets and the Internet, which are all types of networks.

In the illustration shown in FIG. 1, the phone system 100 can be provided in the form of a VoIP phone system 100. Traditionally, VoIP phone systems 100 use digitized audio. The digitized audio can be delivered in packet form and can be transmitted over intranets, extranets, and the Internet. VoIP phone systems 100 can cover computer-to-computer, computer-to-telephone, and telephone-based communications.

Operatively, VoIP phone systems 100 can employ session control protocols to control the set-up and tear-down of calls as well as audio codecs which encode speech allowing transmission over an IP network as digital audio via an audio stream. Codec use is varied between different implementations of VoIP. Some implementations rely on narrowband and compressed speech, while others support high fidelity stereo codecs. Numerous types of VoIP phone system 100 protocols exist, which are known to those skilled in the relevant art.

Continuing, a caller's device, such as a phone 104 depicted in FIG. 1, can be connected to the phone system 100 via an access point 106. The access point 106 can be connected through a wireless network using Wi-Fi, Bluetooth or other related standards. The access point 106 can also be connected using a wired network. Those skilled in the relevant art will appreciate that the components presented within FIG. 1 can be connected through wired networks, wireless networks, or a combination thereof. The connections presented above therefore are not limited to only the phone 104 and the access point 106.

The phone 104 is not limited to any type of fixed or non-fixed communication device. As such, the phone 104 can be, but is not necessarily limit to, a cellphone, smart phone, desk phone, or softphone. As shown, the phone 104 is an IP phone that can include a keypad and a display. In some phones, unique keys can be provided to make calls directly. For example, a called party can be programmed within the phone's speed dial options.

On the display of the phone 104, numerous types of output can be shown, which are provided in blocks 108, 110, 112, and 114. The output can take the form of a simple output message that displays the time of the called party, as shown at output block 108. The output can show the message "Local Time For" and then the number called. Following, the time of the called party can be displayed. In a related embodiment, the output on the display can show the party's name along with or in replacement of the called number. In another embodiment, as shown at output block 110, the time for the called party can be displayed as "Private". In one operational feature of the present application, the called party can choose not to display information about their whereabouts.

At output block 112, other pertinent information that can be useful to a calling party can be displayed. This information can include the called party's business information such as their position. Furthermore, the time zone in which the called party is located can be provided. In one embodiment, as shown at output block 114, a map can be shown for showing the sun's position depending on the location of the called party. When the map shows a lighted portion, then the call is more likely to be answered by the called party. Oppositely, a darker portion would make it more likely that a call may not be appropriate.

Through the outputs provided above, a caller or calling party can retrieve the local time, geographic position, or time zone of a device associated with the called party. Other information such as the called party's business information or other relevant information can also be provided to the phone 104. As will be shown, the called party does not have to be at the called device. Furthermore, the called party can be associated with numerous types of devices. The system and method presented herein can handle numerous devices associated with the called party and determine which device the called party is most likely to be found at. The phone 104 can display the times of the multiple devices and show which device would most likely be answered.

As described above, the called devices can be external to or associated with the phone system 100. When external to the system, the called devices can communicate to the phone system 100 through a voice gateway 116, as shown within FIG. 1. The voice gateway 116 can include private branch exchange (PBX) functions for switching voice calls from the public switched telephone network 120 via a PBX 118 and from the phone system 100. Connected to the PSTN 120 can be client devices 122 that are external to the phone system 100. External client devices 122 can include wired desktops, softphones, wireless devices, mobile phones, laptops, telephones, etc.

The phone system 100 can also communicate with devices that are associated to or connect with the system 100. These connected devices can be distinguished by non-fixed phone locations 124 and fixed phone locations 126. The phone system 100 can maintain records stored within a database of known called party devices for the non-fixed phone locations 124 and fixed phone locations 126.

Non-fixed phone locations 124 can be connected to communication devices 128 that are portable and not tied to a particular area. A softphone 128 or cellphone 128 can be an example of a non-fixed communication device. Fixed phone locations 126 can be connected to communication devices 130 that are typically permanent and unlikely to change their position. Fixed devices 130 can include an IP desk phone, teleworker IP phone, residential phone 130, etc.

The environment 102 provided above can allow a phone to retrieve called party awareness information from devices that are external to or associated with the phone system 100. FIG. 1, nevertheless, represents components illustrative of a typical environment 102 for allowing such interactions to take place. These components should not be construed as limiting the scope of the present application, but instead, the environment should be viewed as only one environment 102 in which the system 100 can operate in.

Methods of Operation

Generally speaking, the phone system 100 described above can allow a calling party to receive awareness information from called devices that are in communication with the system 100, such as those associated with the non-fixed phone locations 124 and fixed phone locations 126, or external to the system 100, such as those associated with the PSTN 120. In summary, for users associated or connected with the system 100, a determination for the local time of each user can be made dependent on the type of phone associated with each user. Each user can have multiple phone numbers that they can be reached at and stored against their profile. Each phone number can have a different type of device associated with it. For example, one number could be for their office IP phone, another could be for a teleworker IP Phone, another could be for their cellphone, and yet another could be a softphone running on top of their PC. These various phone types can fall into one of two possible categories: fixed phone locations 126 and non-fixed phone locations 124. The system 100 can calculate an offset between its own local time and the local time of each phone device to generate the local time of the device.

When the device is external to the system 100, the country and area code of the number dialed can be used to determine the local time of the called device. While potentially less accurate than the other method, as there can be instances where a country/area code combination spans multiple time zones, the system 100 can still provide a good approximation for the local time of the called device. The system 100 can maintain a database or lookup table that can allow the system 100 to determine the time zone for a specific country/area code combination. For example, the system 100 can first search for the country code dialed. Each country can contain a list of time zones within that country. If there is more than one time zone listed, a list of area codes is provided for each time zone. The system 100 can then search within each list of area codes until it finds the area code dialed. When the area code is found, the system 100 can use the time zone value that the area code was found within to calculate the local time by comparing it to its own time zone and time values. When the area code is found in more than one time zone, i.e. the area code spans more than one time zone, the system 100 can provide the time that is furthest away from its own time, in terms of number of zones between itself and the local time of the called party, but it can also indicate on the display that the local time may not be the right time. In another embodiment, the system 100 can provide a time range that spans the multiple time zones covered by the area code (e.g. "between 1:12 & 2:12 PM").

The summary described above was provided for illustrative purposes. One skilled in the relevant art will appreciate that there are numerous ways to implement those features and functions and this application is not limited to those embodiments described above. Following, is a more detailed descriptions of processes for providing called party awareness information.

Caller

Figure 2:
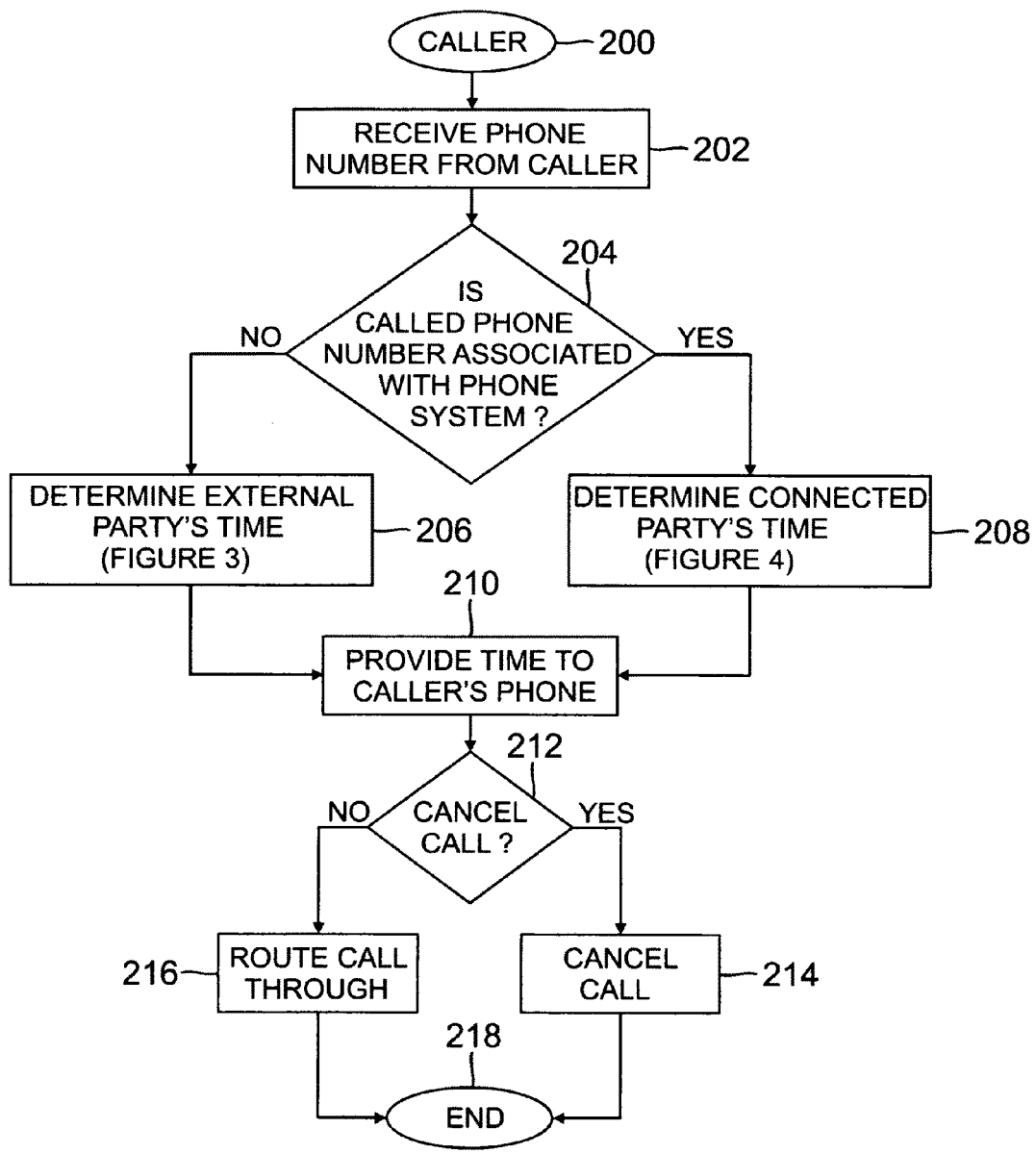
FIG. 2 is an illustrative flow chart for retrieving the local time of a called party in accordance with one aspect of the present application.

FIG. 2 is an illustrative flow chart for showing processes to retrieve the local time of a called device and display that time on a caller's phone in accordance with one aspect of the present application. The processes for retrieving the local time can begin at block 200. As shown within the environment 102 of FIG. 1, the caller can typically be associated with a phone 104, such as an IP phone. On the phone 104, the caller can enter in or provide a phone number or other identifying information to reach a called device. The information can often be entered in through the keypad. Alternatively, other phones 104 can provide special keys where called parties can be dialed quickly and directly.

At block 202, the identifying information can be received from the phone 104 by the system 100 through a communication channel, typically through the access point 106. At decision block 204, the system 100 can determine whether the called device identified by the received information is associated with the phone system 100. In one embodiment, the identifying information can be checked against a number of records stored on a database associated with the system 100.

Often, the called party is not found within the database of the system 100. When no association can be found, a sequence of processes are taken at block 206 to determine the externally located called party's local time, the processes further described in FIG. 3. Alternatively, and in the event that the called party is found within the database, a sequence of processes are taken at block 208 to determine the connected party's local time, which is described in more details in FIG. 4.

At block 210, and after the called device's time is received, the information is provided to the phone 104, where the phone 104 can display it. In other embodiments, the system 100 can return geographic, time zone, personal, and other types of information to the phone 104. Using the local time of the called device, the caller can determine whether to cancel the call at decision block 212. In one embodiment, cancelling a call can be automatically programmed in the calling device, system 100, or called device. For example, these devices can be programmed so that no calls are connected from 10:00 PM to 5:00 AM, which may coincide with a party's work hours. When programmed to automatically cancel the connection, the call may be sent to the called party's voicemail or other similar system. The call can be canceled at block 214 with the processes ending at block 218. Otherwise the call can be routed through to the called party at block 216 with the processes ending at block 218.

Generally, those skilled in the relevant art will understand that the called party can be related to more than one device. In one embodiment, the system 100 can detect called devices where the called party will most likely pick up. There are numerous ways for detecting this. In one embodiment, the system 100 can detect location changes of the called device. In another embodiment, any dialed calls out of the called device can be detected. In another embodiment, the detected device can be tracked using other services associated with the called party such as a calendar or scheduling application.

External to System

Figure 3:
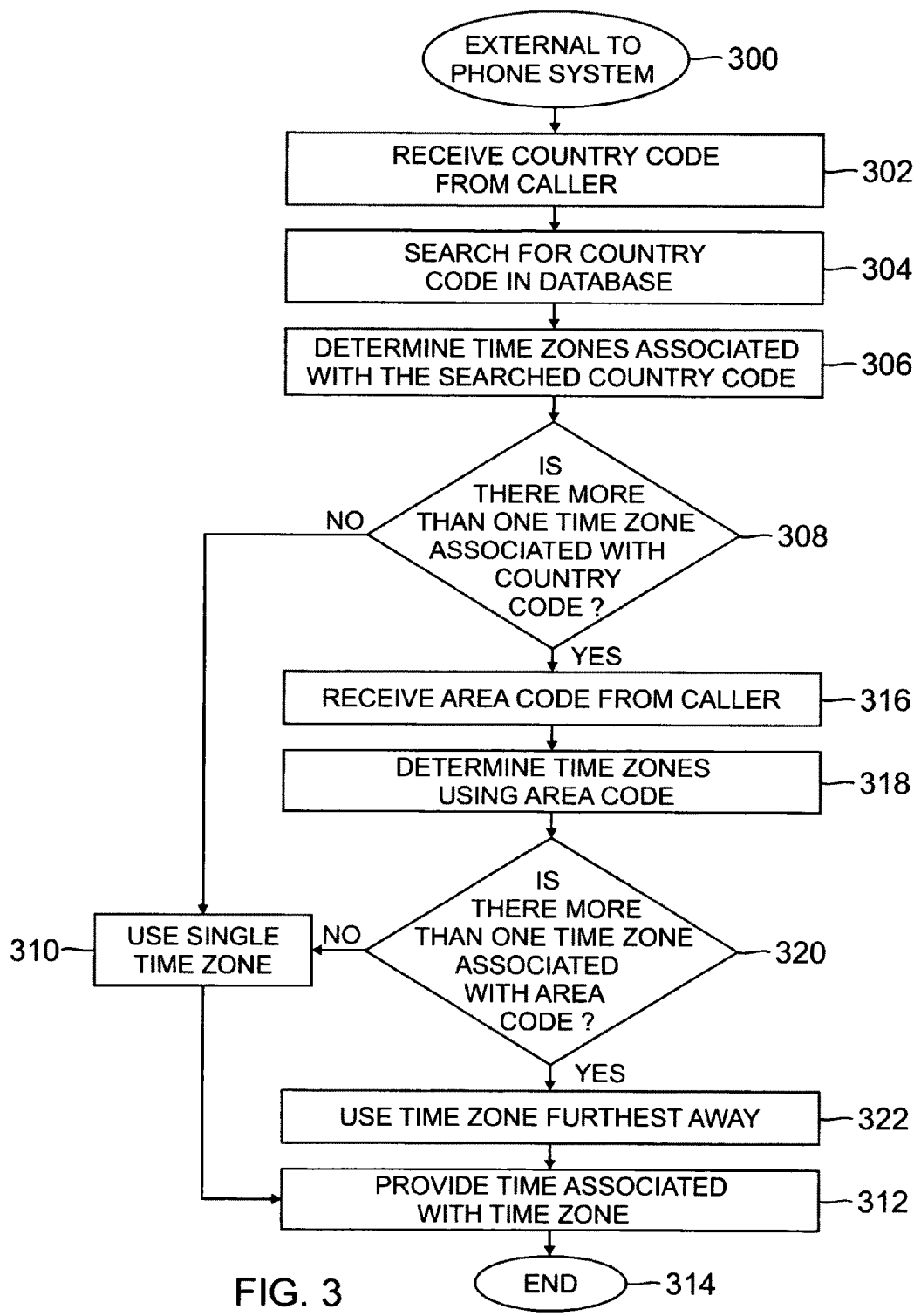
FIG. 3 represents a flow chart diagramming exemplary processes for determining local time information for a device external to the system in accordance with one aspect of the present application.

With reference now to FIG. 3, a flow chart diagramming exemplary processes for determining a local time of a device external to the system 100 in accordance with one aspect of the present application is provided. For calls placed to phones that are not connected to the system, i.e. external numbers, the system 100 can determine the local time using the country and area code within the number dialed. This method is potentially less accurate because there can be instances where a country/area code combination spans multiple time zones.

As shown within FIG. 3, the processes can begin at block 300. At block 302, the system 100 can receive a country code from the caller. For example, a country code of "1" can be used for Canada. At block 304, the system 100 can search for the country code within a database. Through this search, the system 100 can then determine time zones associated with the searched country code at block 306. Each country typically contains more than one time zone. For example, and continuing with the previous illustration, Canada uses six primary time zones. From east to west they include Newfoundland Time Zone, Atlantic Time Zone, Eastern Time, Central Time Zone, Mountain Time Zone, and Pacific Time Zone.

At decision block 308, the system 100 can determine whether there is more than one time zone associated with the country code. When there is not, the single time zone can be used at block 310. In this embodiment, no area code is inspected to determine the local time. At block 312, the time associated with the time zone is provided back to the phone 104.

Returning to decision block 308, when there is more than one time zone associated with the country code, the system 100 can use an area code provided by the caller at block 316 to determine the correct time zone. Typically, the area code is entered at the same time the country code is provided. At block 318, the system 100 can determine the time zones associated with the area code. For example, an area code of "778" would have a time zone of Pacific Standard Time, which narrows down the numerous time zones provided by the country code.

At decision block 320, the system can determine whether there is more than one time zone associated with the area code. When there is not, the single time zone is used to calculate the local time of the called device at block 310. At block 312, the time associated with the determined time zone is provided back to the phone 104 and the process ends at block 314.

Returning to decision block 320, when there is more than one time zone associated with an area code, the time zone furthest away from the local time of the system 100 is used at block 322. When the area code is found, the system 100 can use the time zone value that the area code was found within to calculate the local time by comparing it to its own time zone and time values. In one embodiment, an indication is generally provided to the caller that the local time may not be the right time. At block 312, the time associated with the time zone is provided to the calling device and at block 314, the process can end.

Associated with the System

Figure 4:
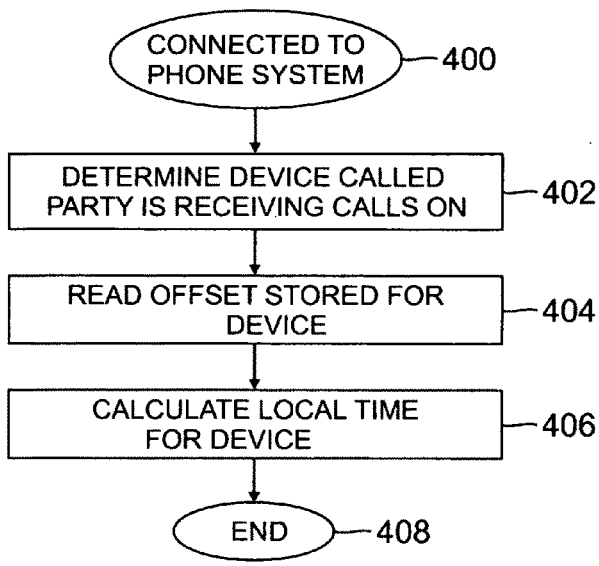
FIG. 4 shows a flow chart describing exemplary processes for determining local time information for a device associated with the system in accordance with one aspect of the present application.

FIG. 4 shows a flow chart describing exemplary processes for determining a local time for a device associated or connected to the system 100 in accordance with one aspect of the present application. As shown, the processes can begin at block 400. Whenever a call is placed from a user on the system 100 to another user on the same system 100, the system 100 can determine which device the called party is receiving calls on at block 402. For example, the user can have set their call routing to direct calls to their cellphone or perhaps they have logged into a desk phone in an office in a different geographic location than their usual office.

After the system 100 has determined which device to direct the call to, it can read the local time offset stored for that device at block 404. In one embodiment, the offset can be determined when the calling party makes the call. Alternatively, the offset is calculated through when the called device powers up, the called party makes any type of communication, etc. The system 100 can then calculate the local time for the device by applying the offset to its own local time at block 406.

For purposes of illustration, if the called party has their call routing set to direct calls to their cellphone and the offset stored for the cellphone is currently minus three (−3), the system 100 can calculate the local time to be three (3) hours earlier than its own current local time. Once the local time has been determined, the system 100 can send a message to the caller's phone 104 with the local time value so that the phone 104 can display it to the caller. The phone 104 can update the local time it is displaying as time goes by. The process can end at block 408.

Calculating Offsets

Figure 5:
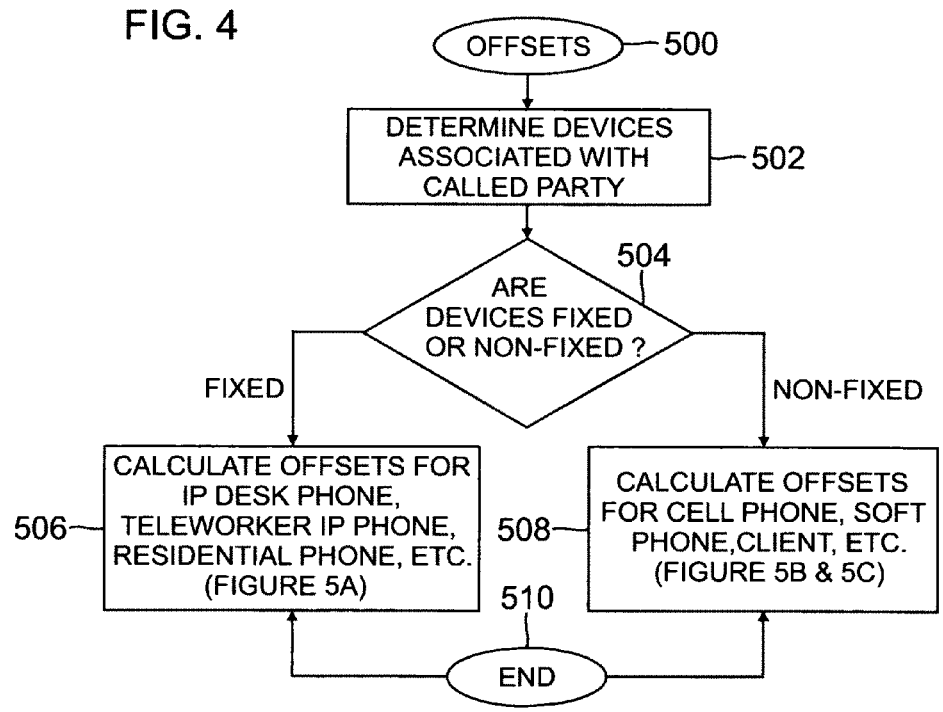
FIG. 5 provides a flow chart showing exemplary processes for calculating offsets whether from a fixed or non-fixed phone location in accordance with one aspect of the present application.

As provided above, offsets are typically used to calculate the time for a called device when the called device is associated with the system 100. The offsets can be calculated when the called party uses their devices or can be calculated when the called party is called by the caller. Those skilled in the relevant art will appreciate that the offsets can be calculated at various times. FIG. 5 provides a flow chart showing exemplary processes for calculating offsets from a fixed or non-fixed phone location in accordance with one aspect of the present application.

As shown within FIG. 5, the processes can begin at block 500. In some embodiments, numerous devices can be associated with the called party. For example, the called party can have a mobile phone as well as a softphone. In typical embodiments of the present application, a number of devices can be kept tracked of along with their offsets. At block 502, the system 100 can determine each of the devices associated with a called party.

At decision block 504, the system 100 can determine whether the called devices are at non-fixed phone locations 124 or fixed phone locations 126. At block 506, the system 100 can calculate offsets for fixed devices 130 such as the IP desk phone, teleworker IP phone, residential phone, etc. Further details for calculating the offsets for the fixed devices 130 will be discussed in FIG. 5A. At block 508, the system can calculate offsets for non-fixed devices 128 such as cellphones, softphones, clients, etc. More details will be discussed in FIG. 5B. The processes can end at block 510.

Fixed Location Phones

Figure 5A:
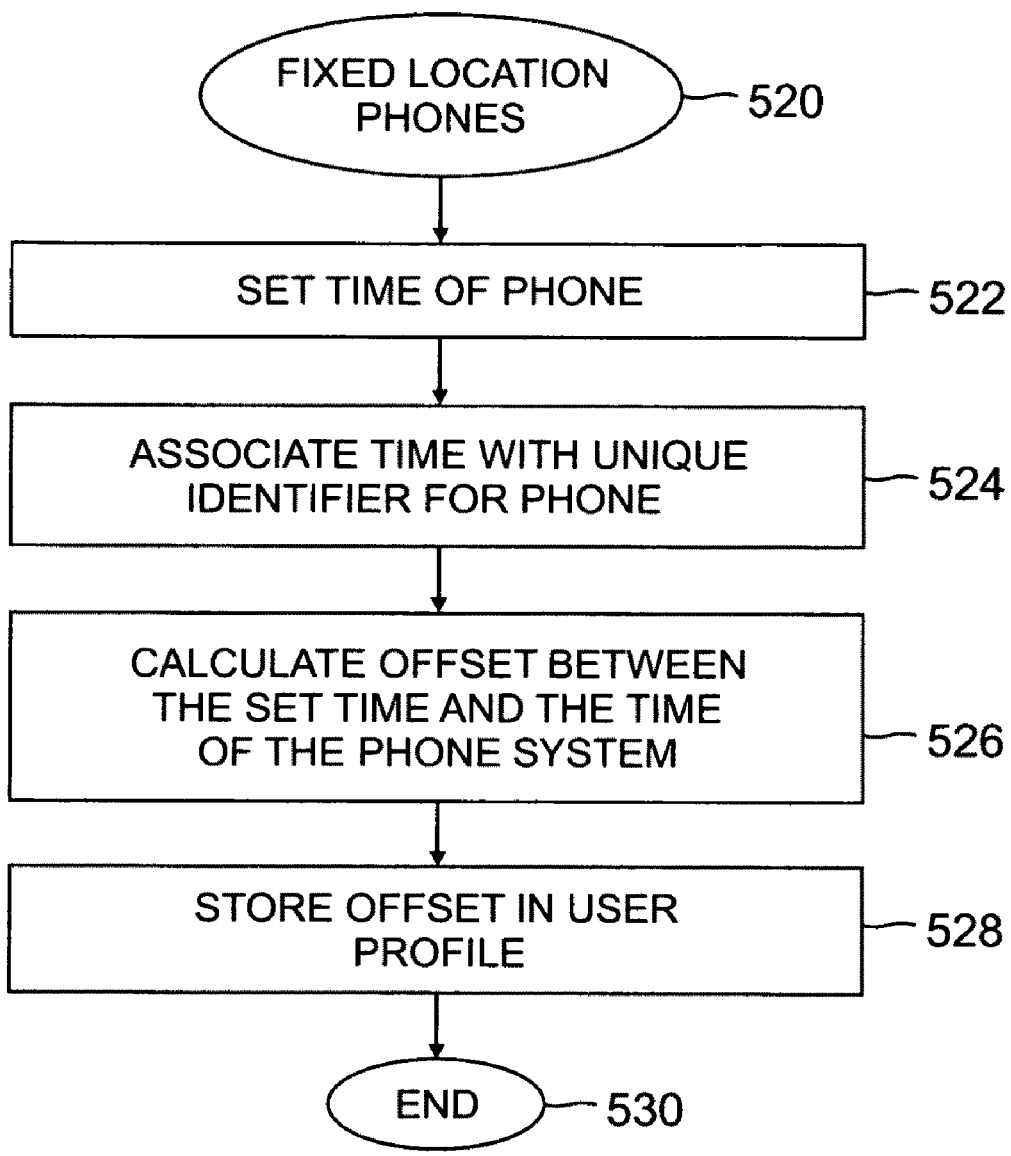
FIG. 5A is an illustrative flowchart depicting processes for providing offsets from a fixed location phone in accordance with one aspect of the present application.

FIG. 5A is an illustrative flowchart depicting processes for providing offsets for fixed devices 130 connected to fixed phone locations 126 in accordance with one aspect of the present application. As shown earlier, the fixed devices 130 can include an IP desk phone, teleworker IP phone, and a residential phone. With the processes beginning at block 520, an administrator or operator can set the time on the phone 130 at block 522. The administrator can determine the time for the physical phone 130 by using Internet websites that can provide local times for cities around the globe. Alternately, the user of the fixed phone location 126 can be prompted by a graphical user interface (GUI) of the phone 130 to enter their local time zone the first time they use the phone and every time the phone is powered up (in case it is moved to a new location). The value entered can then be stored by the system 100. This can save the administrator from having to manually enter a time zone value for all attached phones 130.

The time can then be associated with a unique identifier for the phone 130 at block 524. Those skilled in the relevant art will appreciate that each phone 130 connected to the system 100 can have a unique identifier such as a MAC address. The time zone can then be stored against this identifier rather than against an extension number as it is possible for a user to log into different phones 130 in different geographic locations using the same extension number. In this way every phone 130 on the system 100 can have a time zone value associated with it. At block 526, the system 100 can calculate an offset between the set time on the fixed phone 130 and the time of the phone system 100. At block 528, the offset can be stored in the user profile and the process can end at block 530.

Softphones

Figure 5B:
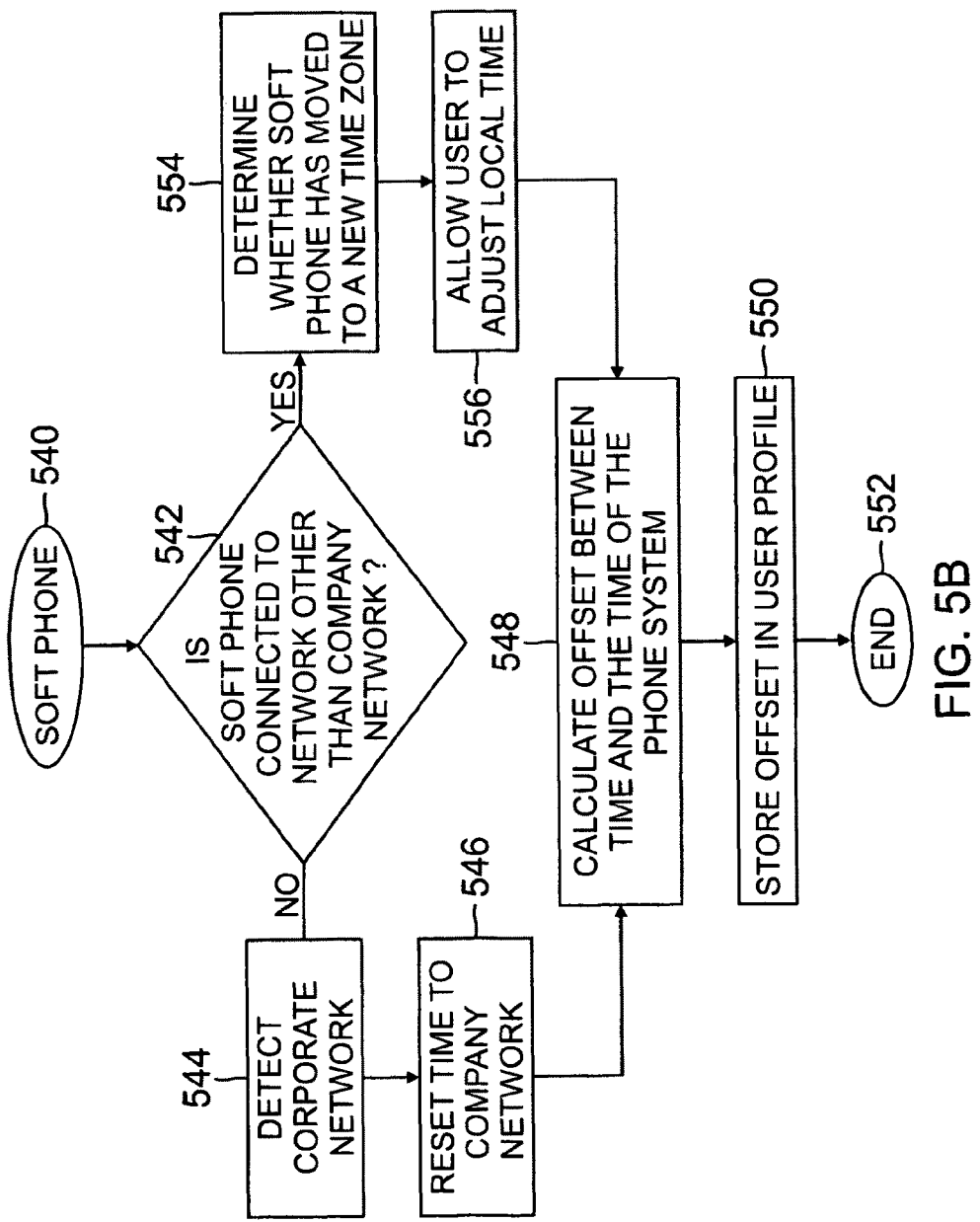
FIG. 5B is an illustrative flowchart representing processes for providing offsets by a softphone in accordance with one aspect of the present application.

FIG. 5B is an illustrative flowchart representing processes for providing offsets through a softphone 128 in accordance with one aspect of the present application. In the case of a softphone running on a PC, functionality can typically be added to the softphone application that reads the time on the user's laptop and sends it to the system 100.

As shown in FIG. 5B, the processes can begin at block 540. At decision block 542, the softphone client application determines when the user has connected to a network other than their corporate network, e.g. when connected to the Internet from within a Hotel room, other corporate network, etc. If the user is connected to a network other than the company network, the system 100 can determine whether the softphone has moved to a new time zone at block 554. In one embodiment, the called party is provided a dialog window that asks the user on their PC display if they have moved into a new time zone. If the user answers affirmatively, the client application presents a dialog that allows the user to adjust the local time at block 556. The local time can then be stored by the softphone client application.

At block 548, the system 100 can calculate the offset between the adjusted local time and the time of the phone system 100. The offset is then stored in the user profile at block 550, thereafter ending the processes at block 552.

Returning to decision block 542, when the user connects their laptop or other mobile device directly to their corporate network, the softphone client application can be detected on the corporate network at block 544. At block 546, the time resets back to the user's home time and sends this to the system 100. The system 100 can then calculate an offset between the local time supplied by the softphone client application and its own local time at block 548. The system 100 then stores the offset in the user's profile for the softphone client at block 550 and the processes end at block 552.

Cellphones

Figure 5C:
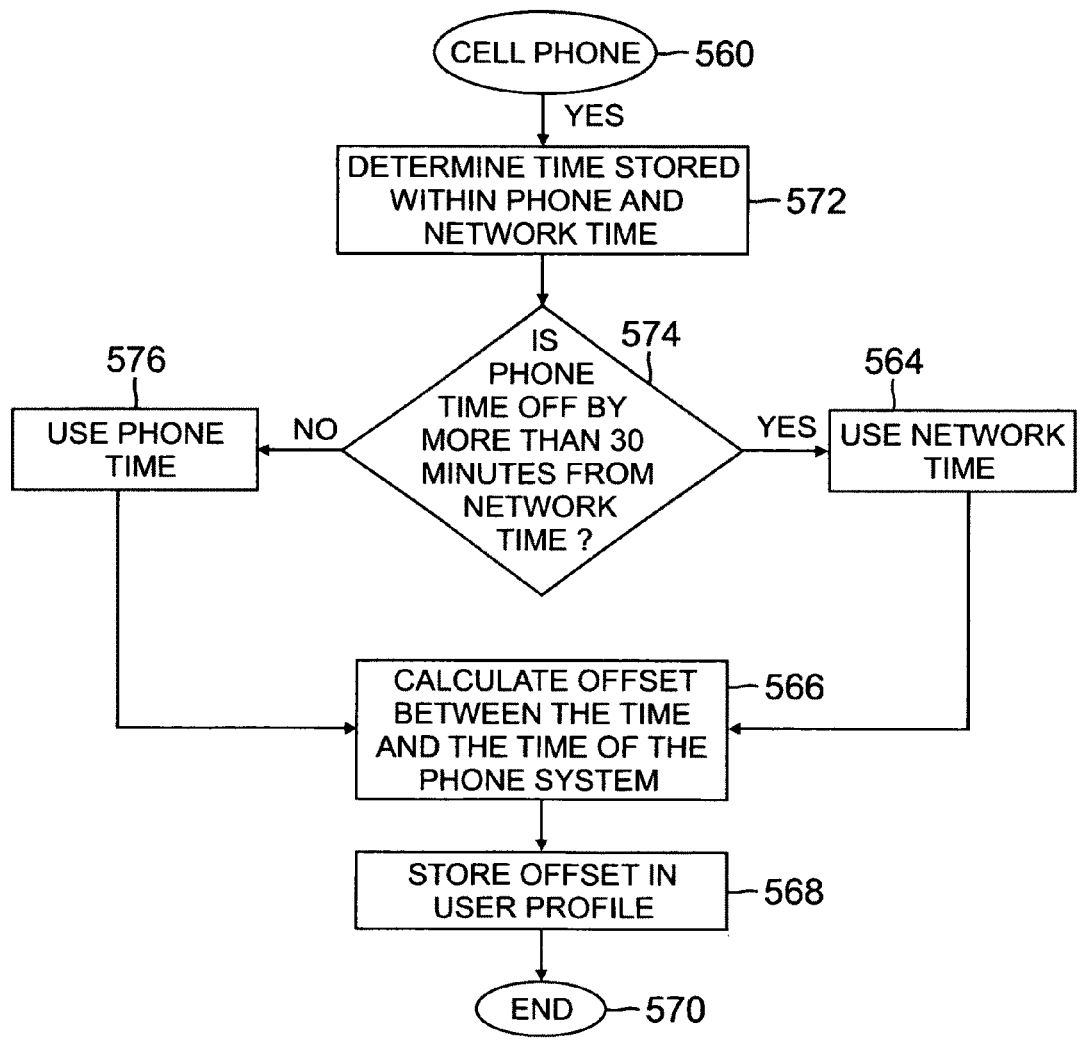
FIG. 5C shows a flowchart illustrating processes for providing offsets by a cellphone or other mobile device in accordance with one aspect of the present application.

With reference now to FIG. 5C, a flowchart illustrating processes for providing offsets from a cellphone or other mobile device in accordance with one aspect of the present application is provided. For cellphones, a software client that the user loads onto their cellphone can be provided. The client can provide the local time of the cellphone to the system 100. Once installed, the software client application can read the time stored within the cellphone and report it back to the system 100 via the cellphone's GPRS link.

As shown in FIG. 5C, the process for retrieving a local time from a cellphone can start at block 560. When the client application has been installed, the system 100 can determine the time stored within the phone's clock application and the network time at block 572. At decision block 574, a determination can be made to calculate the difference between the network time and the phone time. When the phone time is off by more than thirty (30) minutes, or some other predetermined margin, from the network time, the network time can be used as shown at block 564. However, when time for the phone is not off by more than thirty (30) minutes, then the system 100 can use the cellphone's clock application time. The offset can then be calculated between the cellphone time and the time of the phone system 100 at block 566. The offset can then be stored in the user's profile at block 568 and the processes can end at block 570.

In one embodiment, if the network time is not available to the client application, the client application can send the time stored within the cellphone's clock application whenever it is changed manually by the user. The system 100 can then calculate an offset between the local time supplied by the client application and its own local time and store it in the user's profile for the cellphone device. Alternatively, the application can ask the user via the phone's GUI to set the local time every time the phone is powered up. The current time can then be stored within the phone's clock application and be presented to the user. The user can have the option to accept the time if it is correct or change it if it is no longer correct.

Systems, Methods, and Operations

In accordance with one aspect of the present application, a system that displays a local time of a party to be called is provided. The system can include a phone for displaying a local time where a communication device is located. The phone can connect to a communication service provider that provides the local time where the communication device is located to the phone, the local time calculated and provided by the communication service provider before connecting the phone to the communication device.

In one embodiment, the phone for displaying the local time can be an IP phone. In one embodiment, the communication device can be a cellular phone, a smart phone, a softphone, an IP desk phone, a teleworker IP phone, or a residential phone. In one embodiment, the phone can display time for a plurality of communication devices associated with a called party.

In one embodiment, the communication device can be external to the communication service provider. In one embodiment, the communication service provider can determine the local time by using a country code, an area code, or combination thereof.

In one embodiment, the communication device can be associated with the communication service provider. In one embodiment, the communication service provider can determine the local time using an offset, the offset calculated using information provided by the communication device and a time of the communication service provider. In one embodiment, the communication device can be a fixed device, the information corresponding to a time zone entered in by an administrator or operator for the fixed device. In one embodiment, the fixed device can be associated with a unique identifier. In one embodiment, the communication device can be a cellphone, the provided information corresponding to a time on the cellphone when the time on the cellphone is within a predetermined margin of a network time otherwise the provided information corresponds to the network time. In one embodiment, the communication device can be a softphone, the provided information corresponding to an adjusted time on the softphone when the softphone is connected to an outside network. In one embodiment, the communication device can be a softphone, the provided information corresponding to a network time when the softphone is connected to a corporate network.

In accordance with another aspect of the present application, a method for retrieving local time information of a called device and displaying the local time information of the called device on the display of the phone is provided. The method can include receiving identification information associated with the called device from the keypad of the phone. In addition, the method can include providing the identification information to a VoIP phone system, wherein the VoIP system determines whether the called device is associated with the VoIP phone system, the VoIP phone system using the identification information to determine the local time information when the called device is not associated with the VoIP phone system otherwise the VoIP phone system using offsets to determine the local time information generated by the called device when the called device is associated with the VoIP phone system, the VoIP phone system returning the local time information to the phone. The method can also include displaying the local time information on the display.

In one embodiment, the identification information can be a phone number of the called device. In one embodiment, using offsets generated by the called device when the called device is associated with the VoIP system can include determining whether the called device is at a fixed phone location or a non-fixed phone location. In one embodiment, the method can further include displaying a time zone of the called device.

In accordance with yet another aspect of the present application, a phone system for facilitating communication among devices is provided. The phone system can include a database for storing information about known devices. In addition, the phone system can include at least one processor and a memory operatively coupled to the processor, the memory storing program instructions that when executed by the processor, causes the processor to perform processes.

These processes can include receiving routing data from a calling device identifying a called party. The processes can include identifying at least one device associated with the called party. In addition, the processes can include determining whether the at least one device is associated with the phone system using the information about known devices stored on the database. The processes can also include calculating a local time for the at least one device using offsets provided by the at least one device when the called party is associated with the phone system. The processes can include providing the local time of the at least one device to the calling device.

In one embodiment, the processes can include calculating the local time for the at least one device using the routing data provided by the calling device when the called party is not associated with the phone system. In one embodiment, identifying the at least one device associated with the called party can include locating a device where the called party is found using previous activity of the called party.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A system that displays a local time of a party to be called, said system comprising:
a phone for displaying a local time where a communication device is located;
wherein said phone connects to a communication service provider that provides said local time where said communication device is located to said phone, said local time calculated and provided by said communication service provider before connecting said phone to said communication device, said communication device being one of either external to said communication service provider or associated with said communication service provider, and in the event said communication device is external to said communication service provider said communication service provider determines said local time by using a country code, an area code, or combination thereof, or in the event said communication device is associated with said communication service provider said communication service provider determines said local time using an offset, said offset calculated using information provided by said communication device and a time of said communication service provider.

2. The system of claim 1, wherein said phone for displaying said local time is an IP phone.

3. The system of claim 1, wherein said communication device is selected from the group consisting of a cellular phone, a smart phone, a softphone, an IP desk phone, a teleworker IP phone, and a residential phone.

4. The system of claim 1, wherein said phone displays time for a plurality of communication devices associated with a called party.

5. The system of claim 1, wherein said communication device is a fixed device, said information corresponding to a time zone entered in by an administrator or operator for said fixed device.

6. The system of claim 5, wherein said fixed device is associated with a unique identifier.

7. The system of claim 1, wherein said communication device is a cellphone, said provided information corresponding to a time on said cellphone when said time on said cellphone is within a predetermined margin of a network time otherwise said provided information corresponds to said network time.

8. The system of claim 1, wherein said communication device is a softphone, said provided information corresponding to an adjusted time on said softphone when said softphone is connected to an outside network.

9. The system of claim 1, wherein said communication device is a softphone, said provided information corresponding to a network time when said softphone is connected to a corporate network.

10. In a phone having a display and an entry means, a method for retrieving local time information of a called device and displaying said local time information of said called device on said display of said phone, said method comprising:

receiving identification information associated with said called device from said entry means of said phone;

providing said identification information to a Voice over Internet Protocol (VoIP) phone system, wherein said VoIP system determines whether said called device is external to said VoIP system or associated with said VoIP phone system, said VoIP phone system using said identification information to determine said local time information when said called device is not associated with said VoIP phone system otherwise said VoIP phone system using offsets to determine said local time information generated by said called device when said called device is associated with said VoIP phone system, said VoIP phone system returning said local time information to said phone; and displaying said local time information on said display.

11. The method of claim 10, wherein said identification information is a phone number of said called device.

12. The method of claim 10, wherein using offsets generated by said called device when said called device is associated with said VoIP system comprises determining whether said called device is at a fixed phone location or a non-fixed phone location.

13. The method of claim 10, further comprising displaying a time zone of said called device.

14. A phone system for facilitating communication among devices, said phone system comprising:

a database for storing information about known devices;

at least one processor; and a memory operatively coupled to said processor, said memory storing program instructions that when executed by said processor, causes said processor to:

receive routing data from a calling device identifying a called party;

identify at least one device associated with said called party;

determine whether said at least one device is external to said phone system or is associated with said phone system using said information about known devices stored on said database; and in the event said at least one device is associated with said phone system calculate a local time for said at least one device using offsets provided by said at least one device when said called party is associated with said phone system and provide said local time of said at least one device to said calling device; or in the event said at least one device is external to said phone system determine said local time by using a country code, an area code, or combination thereof.

15. The phone system of claim 14, wherein said memory storing program instructions, when executed by the processor, causes said processor to calculate said local time for said at least one device using said routing data provided by said calling device when said called party is not associated with said phone system.

16. The phone system of claim 14, wherein identifying said at least one device associated with said called party comprises locating a device where said called party is found using previous activity of said called party.

* * * * *